United States Patent [19]
Hagar

[11] Patent Number: 5,684,931
[45] Date of Patent: Nov. 4, 1997

[54] LABEL PRINTER, SUCH AS A THERMAL PRINTER FOR PRINTING LABELS

[75] Inventor: Gamal Hagar, Neckarsteinach, Germany

[73] Assignee: Esselte Meto International GmbH, Heppenheim, Germany

[21] Appl. No.: 310,634

[22] Filed: Sep. 22, 1994

[30] Foreign Application Priority Data

Sep. 24, 1993 [DE] Germany .................... 43 32 609.9

[51] Int. Cl.[6] .................................................. G06K 15/00
[52] U.S. Cl. ........................ 395/108; 400/612; 400/605
[58] Field of Search .................................. 395/101, 108,
395/114, 115, 117; 358/503; 346/33 TP;
347/171, 56, 57, 61; 101/69, 66; 400/73,
103, 611, 692, 612, 605

[56] References Cited

U.S. PATENT DOCUMENTS

| | | | |
|---|---|---|---|
| 4,734,710 | 3/1988 | Sato et al. | 347/171 |
| 4,807,177 | 2/1989 | Ward | 395/117 |
| 5,101,481 | 3/1992 | Anger et al. | 395/325 |
| 5,110,226 | 5/1992 | Sherman et al. | 400/88 |
| 5,150,456 | 9/1992 | Wu et al. | 395/114 |
| 5,295,753 | 3/1994 | Godo et al. | 400/612 |
| 5,358,351 | 10/1994 | Murata et al. | 400/605 |

FOREIGN PATENT DOCUMENTS

| | | |
|---|---|---|
| 3901637 | 8/1989 | Germany . |
| 4135830 | 5/1992 | Germany . |
| 4133998 | 4/1993 | Germany . |
| 2211971 | 7/1989 | United Kingdom . |
| 2267984 | 12/1993 | United Kingdom . |

OTHER PUBLICATIONS

"Common I/O Interface Port for I/O Expansion and Printer Buses" IBM Technical Disclosure Bulletin, vol. 28, No. 4, Sep. 1985, pp. 1391–1392.

*Primary Examiner*—Dwayne Bost
*Assistant Examiner*—Tracy M. Legree
*Attorney, Agent, or Firm*—Thomas N. Ljungman

[57] ABSTRACT

A label printer, or a printer in general, can have a processor which can be connected to a data storage medium as well as to data input and data output connections for external devices. Such a printer could include a thermal printer for printing labels on self-adhesive materials. To expand the usability of such a printer, and to increase the printing speed, a common interface can be provided, which interface can be activated by the processor and can be configured in a manner such that both the storage medium and the data input and data output connections for external devices can be connected thereto.

15 Claims, 3 Drawing Sheets

LABEL PRINTER, SUCH AS A THERMAL PRINTER FOR PRINTING LABELS

BACKGROUND OF THE INVENTION

1. Field of the Invention

The present invention generally relates to a label printer having a print head which can he pressed by the force of a spring against a counterpressure roller to print on a label material disposed between the counterpressure roller and the print head. In such a printer, if a printing ribbon is necessary, the active strand of the printing ribbon and a label medium to be printed can preferably run between the print head and the counterpressure roller. The label material for such a printer can typically be supplied in the form of rolls of material, and the printing ribbon, if needed, can be supplied in the form of a cassette. Such a printer can typically be used for printing images or information an self adhesive labels which are typically carried on a peel-away backing material. The labels produced thereby would typically be used for identification of materials and could have a self-adhesive basking for being fastened to the materials.

Printers of the type discussed above, can generally have a few basic components as outlined herebelow:

a) a print head, such as a thermal print head with a series of electrically controlled heating elements that are held in contact with the counterpressure roller;

b) apparatus for holding a payoff reel and a takeup reel of the ribbon, which ribbon could be a thermal transfer ink ribbon;

c) apparatus for providing the label material; and d) a computer processor connected to the control circuit for handling information to be printed on the labels and controlling operation of the printing mechanisms.

Such a printer can also typically have at least one connection site for connecting the processor to external devices, such as an external storage medium, as well as to data input and date output connections for external devices.

2. Background of the Invention

A printer of the type discussed above is disclosed by the published United Kingdom Patent Application GB 2 211 971A. In the printer disclosed thereby, the processor which controls the entire printing mechanism is connected, via a bus, to an input-output port, a read-only memory (ROM) and a random access memory (RAM). The motors for the printing mechanism and the print head are connected to the input-output port. In addition to the connection for the motors, the input-output port also has separate connections to: an interface for an external device, such as a computer; and an additional read-only memory (ROM) for fonts.

With a configuration of this kind, one disadvantage is that the simple printer interface essentially offers only very limited possibilities with regard to the input and output of data. In particular, it is essentially impossible to connect external storage media to the interface, examples of such media being electronic memory boards. Memory boards of this type can contain data which render the printer capable of printing with different fonts, and in the case of the known printers, these boards must be plugged into sockets which are provided specifically for this purpose.

OBJECT OF THE INVENTION

The object of this invention is to expand the capabilities of printers with regard to the input and output of data, so that data from external storage media, e.g. memory boards, can also be read into the printer and output to the storage medium.

SUMMARY OF THE INVENTION

The invention teaches that this object can be achieved by means of a common interface which can be activated by the processor. As such, it can essentially be possible to connect both the storage medium and the data input and data output connections for external devices to the same interface.

The essential idea of the present invention is to equip the printer with a universal interface, to which interface it can be possible to connect both storage media and circuit boards with data input and data output connections for external devices. For example, the ability to connect additional memory boards can essentially make it possible to increase the memory capacity of the printer or to reproduce different fonts from data which are permanently stored in a ROM. In addition, the ability to connect a graphics board can make it possible to inspect the image to be output as hard copy on a screen before the image is printed onto the printing medium. This can essentially make possible the visual detection and correction of any possible defects before any printing is performed. Further, the universal interface can also preferably be used to connect essentially any input-output boards which may be desired. Such extra boards can then typically be connected to connections, generally provided as standard equipment, for data sources, e.g. computers, which would typically not be connected via the interface, but would instead be connected to the processor in some other manner.

The advantages provided by a universal printer interface in accordance with the present invention reside principally in the universal expandability of the printer, since any commercially available and reasonably priced plug-in boards could then typically be used.

As a general rule, plug-in boards typically have a write signal wire and a read signal wire for data input and data output connections for external devices, as well as a write signal wire and a read signal wire for storage media. Therefore, the printer interface should essentially also be equipped with such wires as well.

However, if a particularly fast processor, such as a Reduced Instruction Set Computer (RISC) printer processors (e.g. AMD 29200) is used to achieve higher printer speeds, with an instruction set which is reduced in comparison to the set used for conventional processors, the use of a multiplexer would essentially be necessary. This would typically be the case because such especially fast printer processors have only a read signal wire and a write signal wire, and do not have an output connection for distinguishing between external storage media and devices of other types. A multiplexer, in conjunction with an address decoder logically connected to the address bus associated with the processor, can be configured to recognize the type of activating device from an output signal from the address decoder. Thus, the multiplexer can essentially control the four wires of the interface in a corresponding manner (the write signal wire and the read signal wire for data input and data output connections for external devices, and the write signal wire and the read signal wire for storage media). By means of the address decoder and multiplexer, the processor can, by referring to its address bus, thus switch over between the different types of external devices.

To be able to use plug-in boards with data buses of different widths, the present invention also teaches that a circuit configuration should be provided wherein the processor can switch from one data bus width to another. It can therefore be possible, for example, to use either 8-bit or 16-bit plug-in boards. In practice, the switching between data buses can preferably be performed by hardware, that is, by means of a buffer which can be inserted into the bidirectional data bus associated with the processor. Such a buffer can be controlled by a separate output from the processor, and can be capable of stopping the transmission of the high-order bits on the data bus (i.e. can be capable of switching the data bus to a high-impedance condition).

Finally, it is also recommended that the interface preferably be equipped with a separate baud rate generator, as a clock generator. Such a separate clock generator can preferably be configured to operate the processor at any desired clock frequency, and in particular at a frequency higher than that of its own clock generator.

Further details of the present invention are provided herebelow with reference to the accompanying drawings. When the word "invention" is used in this specification, the word "invention" is also meant to include "inventions", that is, the plural of "invention". By stating "invention" the applicant does not in any way admit that the present application does not include more than one patentably and non-obviously distinct invention, as this application may include more that one patentably and non-obviously distinct invention. The Applicant hereby asserts that the disclosure of this application may include more than one invention, and in the event that there is more then one invention, that these inventions may be patentable and non-obvious, one with respect to the other.

One aspect of the invention resides broadly in a thermal label printer for printing labels on a label material, the thermal label printer comprising: print apparatus, at least one printing element disposed on the print apparatus, the at least one printing element being configured to be thermally heated to print a label; counterpressure apparatus disposed adjacent the at least one printing element for being pressed upon by the at least one printing element; apparatus for storing label material to be printed on; apparatus for storing thermal printing ribbon, the thermal printing ribbon comprising a printing substance for being transferred to the label material; apparatus for providing label material to be printed on from the apparatus for storing label material to an area between the at least one printing element and the counterpressure apparatus; apparatus for providing thermal printing ribbon from the apparatus for storing thermal printing ribbon to an area between the at least one printing element and the label material; apparatus for actuating the at least one printing element for heating, the at least one printing element and for transferring printing substance from the thermal printing ribbon to the label material to print a label; computer processor apparatus for controlling the apparatus for providing label material, for controlling the apparatus for providing thermal printing ribbon, and for controlling the apparatus for actuating the at least one printing element; apparatus for inputting information to be printed on labels to the computer processor apparatus, the computer processor apparatus further comprising: apparatus for receiving the input information, apparatus for processing the input information; and apparatus for outputting control signals to at least one of: the apparatus for providing label material, the apparatus for providing thermal printing ribbon, and the apparatus for actuating the at least one printing element, to print the input information on the label material to produce a label; and the thermal label printer further comprising a universal interface, the universal interface comprising apparatus for connecting the processor to at least one external device, the at least one external device comprising at least one of: external memory, a graphics board, at least one data input connection and at least one data output connection.

Another aspect of the invention resides broadly in a label printer for printing labels on a label material, the label printer comprising: apparatus for providing label material; print apparatus for printing on the label material; computer processor apparatus for controlling the print apparatus and the apparatus for providing label material; apparatus for providing information to be printed to the computer processor apparatus, the computer processor apparatus further comprising: apparatus for processing the information to be printed; and apparatus for outputting control signals to at least one of: the apparatus for providing label material, and the print apparatus, to print the input information on the label material to produce a label; and the label printer further comprising a universal interface, the universal interface comprising apparatus for connecting the processor to at least one external device, the at least one external device comprising at least one of: external memory units, graphics boards, at least one data input connection and at least one data output connection.

A still further aspect of the invention resides broadly in a method for operating a label printer, the label printer comprising: apparatus for providing label material, print apparatus for printing on the label material, computer processor apparatus for controlling the print apparatus and the apparatus for providing label material apparatus for providing information to be printed to the computer processor apparatus, the computer processor apparatus further comprising: apparatus for processing the information to be printed; and apparatus for outputting control signals to at least one of: the apparatus for providing label material, and the print apparatus to print the input information on the label material to produce a label, and a universal interface for connecting the processor to at least one of: external memory, graphics boards, at least one data input connection and at least one data output connection; the method comprising: providing label material to be printed upon; providing print apparatus for printing on the label material; providing computer processor apparatus for controlling the print apparatus; providing apparatus for providing information to be printed on the label material; connecting a universal interface to the computer processor apparatus; and providing at least one of: external memory, a graphics board, and a data input/output connection; and the method further comprises: connecting the at least one of: the external memory, the graphics board, and the date input/output connection to the universal interface; and printing information on the label material, the printing comprising reading printing information from, and writing printing information to the at least one of: the external memory, the graphics board, and the data input/output connection with the computer processor apparatus via the universal interface.

BRIEF DESCRIPTION OF THE DRAWINGS

Preferred embodiments of the present invention are explained in greater detail below with reference to the accompanying drawings, in which.

DESCRIPTION OF THE PREFERRED EMBODIMENTS

Figure 1:
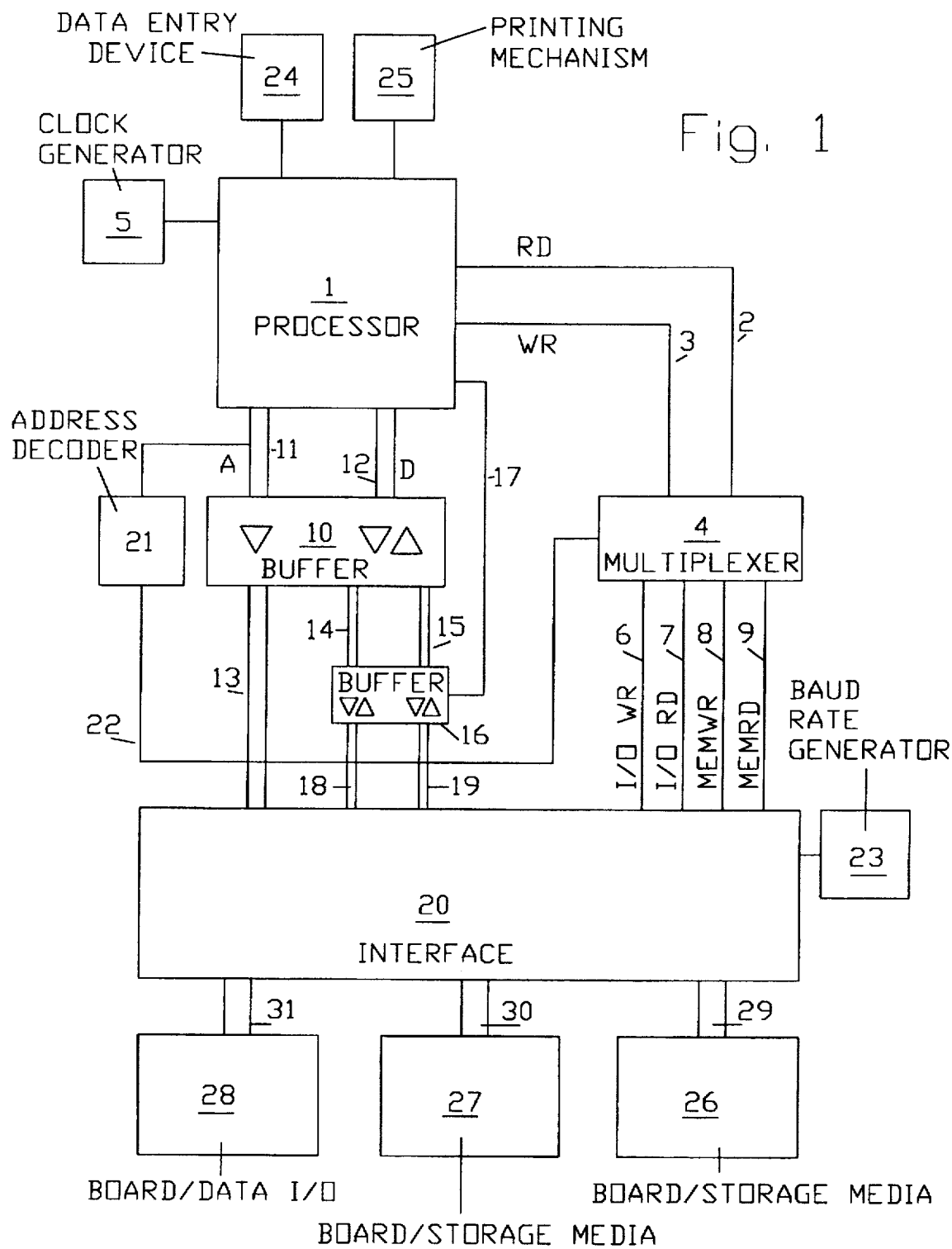
FIGS. 1 and 1a are schematic diagrams of data input and data output circuits of a printer.
Figure 1A:
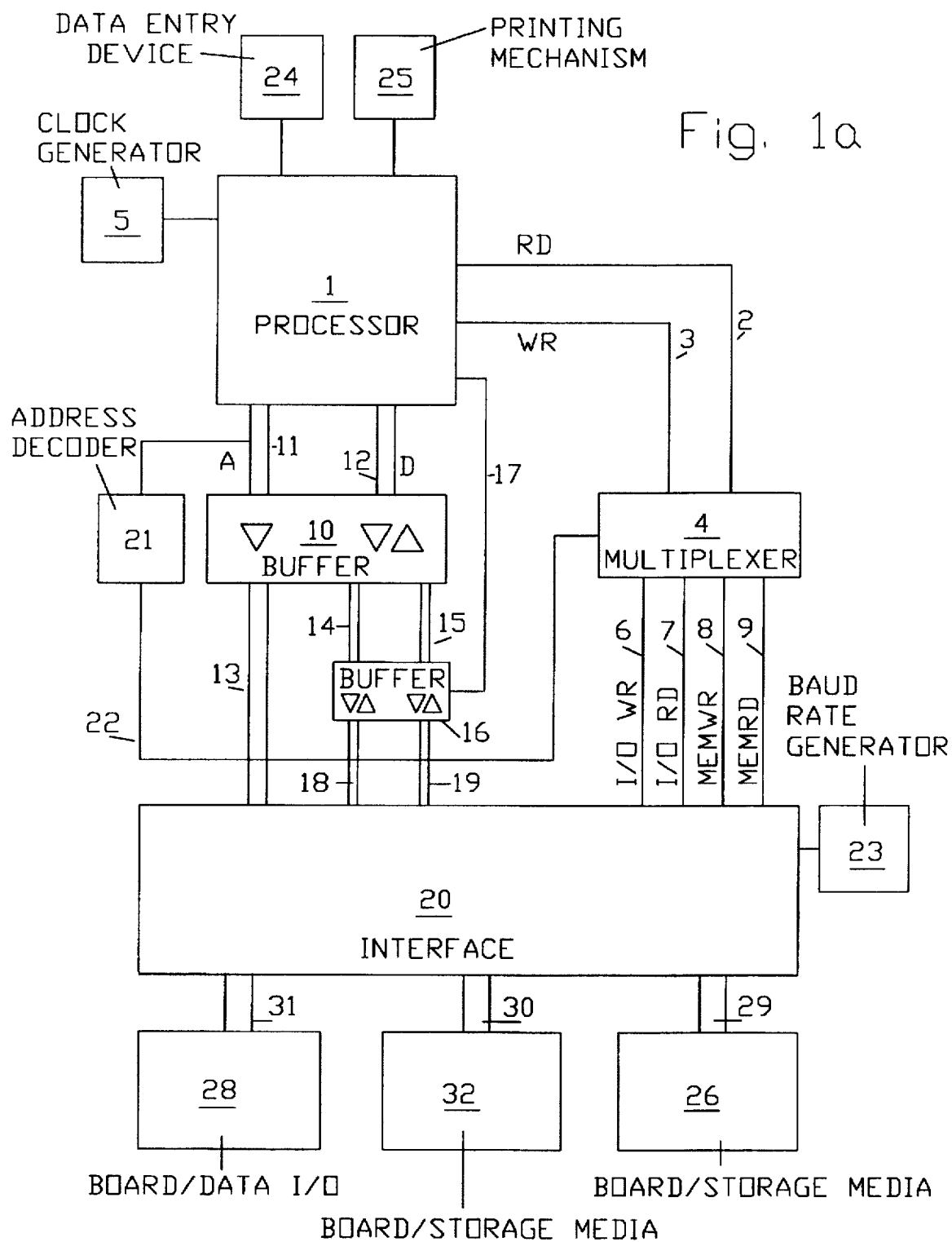
Figure 2:
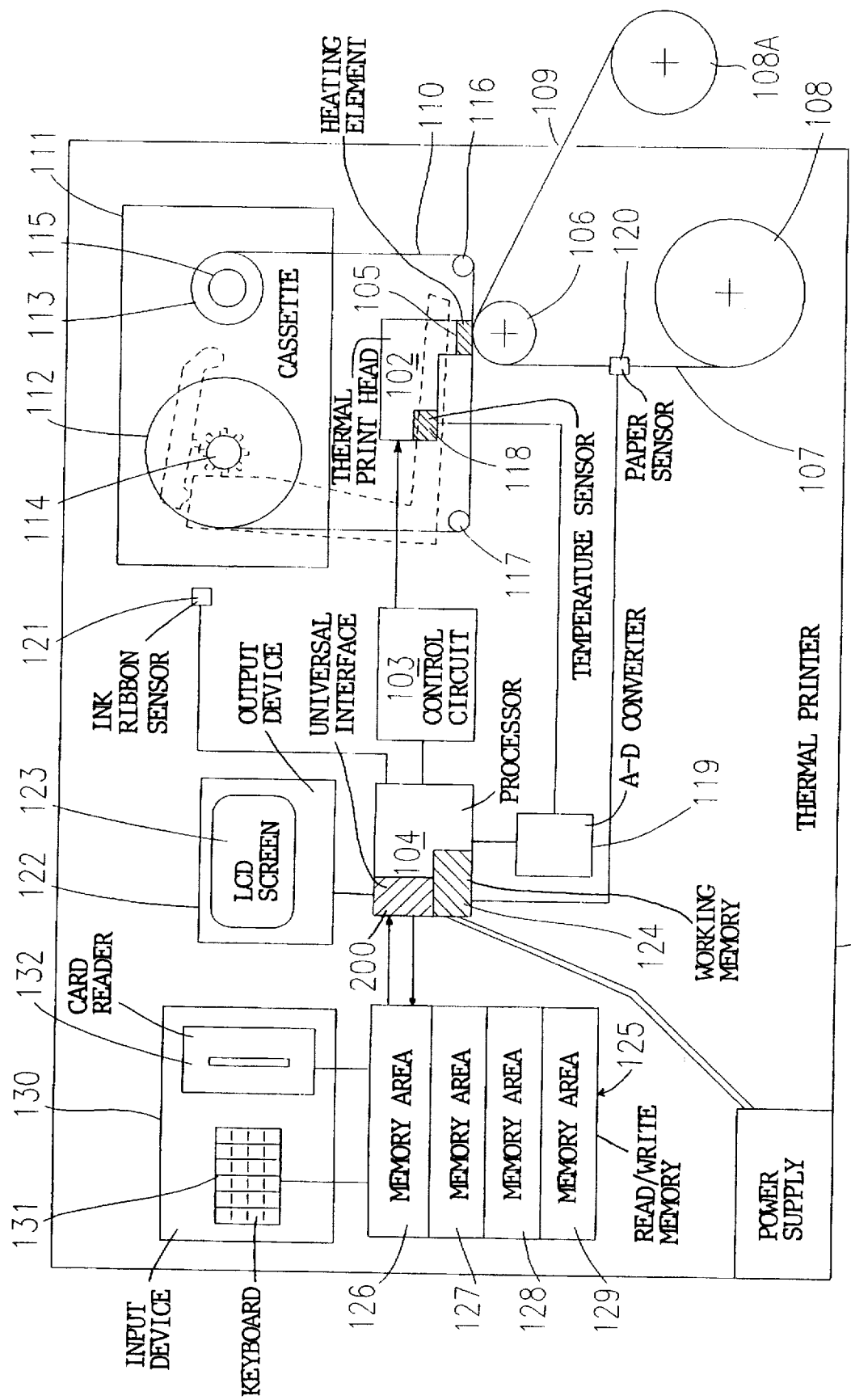
FIG. 2 is a general schematic of a printer in accordance with the present invention.

For purposes of simplification, before discussing the schematics of FIGS. 1 and 1a with regard to the circuitry of a printer, a brief discussion of printers in general is presented first with reference to FIG. 2.

One type of printer in accordance with the present invention could be a thermal printer as depicted in FIG. 2, while the present invention is also applicable to other types of printers as well. In essence, such printers could include laser printer, impact dot matrix printers, ink jet printers, etc. The thermal printer in accordance with FIG. 2 shows one possible embodiment of a printer and the interface of components therewith, while the embodiments as discussed further herebelow with reference to FIGS. 1 and 1a depict a more detailed embodiment of the circuitry and connections of a printer.

As shown in FIG. 2, a thermal printer 101 can have a thermal print head 102 which can be electrically connected by means of a control circuit 103 to a computer processor 104. On the underside of the thermal print head 102 there can preferably be electrically activated heating elements 105, which can be maintained in contact against a counterpressure roller 106. Preferably, the heating elements 105 can be oriented in a straight line lying perpendicular to the plane of the drawing and aligned with a longitudinal axis of the counterpressure roller 106.

A label strip 107 can be introduced between the heating elements 105 and the counterpressure roller 106. As the label strip 107 is printed, it is preferably unrolled by means of a label strip payoff reel 108, and can, if desired be taken up by a take-up reel 108A. After having been printed with the desired printing information, the label strip 107 can be output by means of an outlet opening 109 of the thermal printer 101. The above described thermal printer apparatus 101, including the print head 102, the heating elements 105 and the label stripe 107, are generally known in the art and are therefore not described in any great detail herein.

The label strip 107 can be temperature-sensitive paper which is printed as it is moved past the pin-shaped heating elements 105. Appropriate ones of the heating elements 105 can be heated as necessary, and the areas of the paper, or label strip 107, to which heat is applied can thereby be darkened at the desired points. Alternatively, the label strip 107 can also be conventional writing paper. With such conventional writing paper, it would however be necessary to introduce a thermal transfer ink ribbon 110 between the label strip 107 and the heating elements 105 of the thermal print head 102. The thermal transfer ink ribbon 110 can essentially be coated with temperature sensitive ink, which can preferably be configured to melt at the points where it is moved past activated, or heated, heating elements 105. The melted ink then can adhere to the conventional label strip 107 to thereby form a desired printed image.

Such a thermal transfer ink ribbon 110 can preferably be housed in a cassette 111, which cassette 111 can preferably have a payoff reel 112 and a take-up reel 113 therein. The cassette 111 can generally be positioned within the thermal printer 101 by means of devices 114, 115 which are configured to fit into, or hold the reels 112, 113. The thermal printer 101 can also preferably have deflector rollers 116, and 117 disposed within the printer housing, to direct the path of the ink transfer ribbon past the print head 102 and heating elements 105. Such deflector rollers 116, 117 essentially make certain that the thermal transfer ink ribbon 110 is moved past the heating elements 105 at the optimum angle for transferring the ink to the paper, or label strip 107, in which the ribbon 110 is in contact at the print head 105. Such thermal transfer ink ribbons, and the manner of transferring the ink thereon, are also considered to be well known in the art.

The thermal print head 102 can be equipped with a temperature sensor 118 to transmit an analog electrical signal corresponding to the temperature of the thermal print head 102 to an analog-digital (A-D) converter 119. This A-D converter can then digitize the temperature signal and transmit the digitized signal to the processor 104.

The processor 104 can also preferably be connected to a paper sensor 120, which can be, for example, a photoelectric cell which detects the presence of a label strip 107, and reports the presence or absence of a strip to the processor 104. Alternatively, the paper sensor 120 can also be configured as a laser scanner which is capable of reading bar codes. If such a scanner were to be used, bar code markings, indicative of the type of paper being used, could be provided on the paper strips. The bar code markings on the label strip 107 could then be automatically read by the scanner to provide the processor 104 with information not only about the presence of the label strip material, but also about the type of label strip material present. These data can be retrieved by the processor 104 for further processing.

The processor 104 can also preferably be electrically connected to an ink ribbon sensor 121. This ink ribbon sensor 121 can be designed either as a photoelectric cell, only to detect the presence of the thermal transfer ink ribbon 110, or, as discussed above for the paper sensor, can be designed as a laser scanner which can read the bar codes applied to the cassette 111, to thereby provide information on the material, or type of thermal transfer ink ribbon 110 being used. Photoelectric cells and laser scanners are essentially well known, and are therefore not described in any further detail herein.

Other types of sensors or scanners, within the skill of the artisan could also be used for detecting the paper or ink ribbon, or alternately scanning information provided on the paper or ink ribbon.

In order to make the thermal printer more "user-friendly", the processor 104 can preferably be connected to an optical data output medium 122. Such an output device 122 could provide an LCD screen 123 for displaying variables which the operator may have to adjust, or to alternately display control commands for operation of the printer. Various alternative output devices would also be within the skill of the artisan.

The processor 104 can also preferably be equipped with a working memory 124, the capacity of which is preferably sufficient to buffer the control data supplied both by a read/write memory 125 connected to the processor 104, and also by the paper sensor 120 and by the ink ribbon sensor 121 during a printing process. The processor 104 can preferably use this information to control the label printer 101. With such a buffer, or working memory 124, the processor could essentially operate at higher speeds as data transfer between the read/write memory 125 and the processor 104 would not need to continuously take place.

The read/write memory 125 can essentially be partitioned into several areas depending on the features of the thermal printer. The example shown in FIG. 2 essentially depicts four memory areas 126 to 129, but more or less could be provided, with the possibility for future expansion as needed. The memory areas could be set up as provided below, but the following is meant as an example only, and various other set-ups would be well within the skill of the artisan.

A first memory area 126, could be used to store the information which is to be applied, or printed on the labels. A second memory area 127 could be used to store a data matrix corresponding to the various types of paper which are usable for the label strips 107. A third memory 128 could be used to store the printing speed, that can be set or selected by the operator, and a fourth memory area 129 could be used to store the ink ribbon data corresponding to the various types of paper of the specified label strip 107.

The above described data arrays can preferably be read into the read/write memory 125 by means of a data input device 130. Such an input device 130 could essentially be a computer keyboard 131 and a card reader device 132, or in essence could essentially be any type of input mechanism which are commonly used for entering data values into computers, i.e. a scanner.

During the installation of the thermal printer, the data matrices corresponding to the types of paper to be used can be read into the corresponding memory area, or in this example, the second memory area 127. Likewise, the ink ribbon data can be read into its corresponding memory area, or the fourth memory area 129 of the read/write memory 125. Then, when printing is to be done, the data to be printed on the label strip 107 can be input into its corresponding memory area, or the first memory area 126 by means of the input device 130, or computer keyboard 131 and the card reader 132.

The processor 104, via the LCD screen 123, can then preferably output a list of the types of paper that were read into the second memory area 127. The operator can then manually select the data matrix corresponding to the type of paper to be used. Further, the printer may also be set up so that the operator is given an opportunity to verify whether there is a data matrix already stored for the particular type of paper of the label strap 107. Thus, if necessary, the appropriate data matrix can then be read into the corresponding memory area, or second memory area 127 of the read/write memory 125. Alternatively, a label strip 107 of a paper with a data matrix already stored in the memory and displayed on the LCD screen 123 can be introduced into the thermal printer 101.

The processor 104 can then retrieve the data matrix corresponding to the type of paper selected, and can call up the corresponding ink ribbon data from the read/write memory 125, and store these date in its working memory 124.

By means of the LCD screen 123, the processor 104 can output a list of the possible printing speeds contained in the data matrix, and thus enable the operator to select a desired printing speed. If the operator does not select a speed, the processor can automatically default to a predetermined printer speed, which can be, for example, the maximum possible printing speed of the printer. Alternately, if it is known that operation at the maximum speed is not desired, alternative default speeds, such as 50% or 75% of the maximum speed could be entered as the default speed if so desired.

The above described thermal printer 101, thereby provides an opportunity at the beginning of the printing process to select a printing speed, which printing speed can then be stored in the third memory area 128 of the read/write memory 125. After the selected data matrix has been read into the working memory 124, the processor 104 can preferably retrieve the value corresponding to the desired printing speed from the third memory area 128, and compare this value to the speed values contained in the data matrix. The processor 104 can then preferably automatically select the value from the data matrix which either corresponds to, or is closest to the selected printing speed.

By means of the temperature sensor 118, the processor 104 can measure the temperature of the thermal print head 102 and then select, from the data matrix, the temperature value corresponding to, or closest to this value.

From the data matrix, and using the above-chosen temperature and speed values, the processor 104 can then preferably select the reference energy value which is specified for the measured value of the thermal print head temperature and the selected or specified printing speed.

In addition to the above-determinations, the processor can also proceed with determining whether or not an ink ribbon is needed, or what type of ribbon is needed. On the basis of the ink ribbon data read into the working memory 124 and specific to the type of paper, and on the basis of the data supplied by the ink ribbon sensor 121, the processor 104 can then check for the following conditions:

A) whether there is a "1" in the second row of the ink ribbon data (indicating that an ink ribbon is needed), and whether a cassette 111 for the thermal transfer ink ribbon 110 has been inserted; or B) whether there is a "0" in this position and no cassette 111 has been inserted.

If the requirements indicated above are not fulfilled, the processor can be set up to indicate such to the operator by means of an error message, either a visible, or audible warning. The error message could also contain information as to how to correct the problem, for example, either to remove the wrong cassette 111 which has been inserted, or to insert the missing cassette 111.

The processor 104 can also check to see whether there is a "0" in the third row of the ink ribbon data list, or possibly another digit identifying a thermal transfer ink ribbon 110. On the basis of this value and the values supplied by the ink ribbon sensor 121, the processor 104 can check, if necessary, to see whether the correct thermal transfer ink ribbon 110 has been inserted. By means of an error message displayed on the LCD screen 123, or possibly by an audible warning, the operator can preferably be requested to insert the correct thermal transfer ink ribbon 110 into the printer, if necessary.

Also, on the basis of the data supplied by the paper sensor 120, the processor 104 can preferably check to see whether a label strip 107 has been inserted. A warning signal can also be generated if a paper strip is not present, indicating to the operator that paper needs to be inserted.

The processor 104 can then retrieve the printing information read into the first memory area 126 of the read/write memory 125, and initiate the printing process. To initiate the printing process, the processor 104 will essentially transmit the printing information, the selected or specified printing speed, and the reference energy value selected from the data matrix to the control circuit 103 of the thermal print head 102. The control circuit 103, by means of electrical connections and driver circuits (not shown, but commonly known in the art), can then drive the counterpressure roller 106 to transport the label strip 107, as well as the thermal transfer ink ribbon 110, preferably by means of electric motors, not shown in the figure. The motor for driving the ink ribbon 110 would preferably be connected to the take-up reel 113. The control circuit 103 can also preferably start the printing process itself by activating the individual heating elements 105 as a function of the input and measured data.

The reference energy value determined from the printing speed and the thermal print head temperature essentially then controls the thermal energy generated by the heating elements 105. The thermal energy generated would preferably be greater, the higher the printing speed set, and the lower the measured thermal print head temperature. Preferably, the thermal energy can be controlled by changing the times at which a specified voltage is applied to the heating elements 105. Such heating elements 105 are preferably designed as resistance heating elements.

If the paper sensor 120 is configured as a laser scanner capable of reading bar codes, and if markings are applied to the labels in the form of bar codes which provide information on the type of paper used for the labels, the operation of the thermal printer 101 can essentially be automated because the type of paper for the labels need no longer be input manually by the operator, but the processor 104, by means of the paper sensor 120, can automatically identify which type of labels have been inserted. On the basis of the data received in this manner, the processor 104 retrieves the corresponding data matrix from the second memory area 127 of the read/write memory 125, and the ink ribbon data specified for the type of paper identified from the fourth memory area 129. Using these data, the thermal printer 101 can be controlled by the processor 104 as described above.

The processor 104 as depicted in FIG. 2 can also be connected to a universal interface 200 which can enable the printer to be connected to the plurality of external devices as well, as will be discussed herebelow with reference to FIGS. 1 and 1a.

As depicted in FIGS. 1 and 1a, in a basic configuration, a control circuit of a printer can have a processor 1 which, on the one hand, preferably controls the actual printing mechanism 25 and which, on the other hand, is supplied with the data to be printed. The data to be printed can be input to the processor via an address bus 11 and a data bus 12. The circuit further comprises an interface 20 to which different plug-in boards with storage media 26, 27 and data input and output connections 28 for external devices are connected.

The printing mechanism 25 preferably includes the mechanical and electronic elements which are necessary for accomplishing printing, and thus comprises, at least one print head and a motor for feeding the print medium, which can be paper. Alternatively, for the printing of labels, for example, the print medium can be labels affixed to a backing strip. The printing mechanism 25 is not shown in detail in the drawing, since a technical skilled in the art will already be familiar with the printing mechanisms of a printer. If the printer is a thermal printer, the processor 1 also controls the heating elements of the thermal print head, as discussed above.

The timing of the processor 1 can preferably be defined by a clock generator 5. The operator can preferably control the processor 1, and thus the printer, by means of a data entry device 24 which can be configured as a keyboard and/or as an operator control panel.

The decisive innovation associated with the present invention resides in the use, in a printer, of the interface 20 to which different plug-in boards can be connected, each via a bus 29–32. As shown in FIG. 1 or 1a, the interface 20 can make it possible to connect known and commercially-available boards with storage media 26, 27, boards with data input and data output connections 28 for external devices (I/O boards such as Centronics interfaces, RS 232 and RS 485 interfaces, network interfaces (Ethernet), coaxial or twinax interfaces), or graphics boards 32, to the processor 1. It would of course be possible to connect more plug-in boards than the three which are shown connected to the interface 20 in the drawing, and the addition of such connections would be well within the skill of the artisan, and could be dependent on the type/size of universal interface 20 used. It would also be well within the skill of the artisan to provide alternative combinations of external device other than the combinations as shown in FIGS. 1 and 1a.

The address bus 11 associated with the processor 1 can be connected, via a unidirectionally operating section of a buffer 10, to the address bus 13 associated with the interface 11, while the data bus 12, associated with the processor 1, can preferably be connected to the interface 20 by means of e bidirectional section of the buffer 10 and an additional buffer 16 which can be caused to switch over. The address of a storage or memory device, read out by the processor 1, can consequently be transmitted via the unidirectional section of the buffer 10 to the interface 20, and transmission of an address in the opposite direction is generally not necessary.

Data, on the other hand, can be transmitted in both directions, that is, to and from the processor 1. Thus, for example, it is possible to write data onto a memory board and to read data from a memory board. On the side of the buffer 10 opposite the processor 1, the data bus 12 associated with the data transfer can be split into two halves, each of which, as a rule typically accommodates 8-bits. Each of the two 8-bit halves can preferably be transmitted on a separate bus 14, 15, to provide the ability to vary the width of the data word by means of the switchable buffer 16, also operating bidirectionally. The switchable buffer 16, controlled by the processor 1 via a wire 17, in a first mode of operation, can enable data buses 18, 19, connected to the interface 20, to "loop through" onto the data buses 14, 15, connected to the buffer 10, to transmit the width of the data bus (and therefore, as a rule, 16-bits). Alternatively, the buffer 16 can provide the possibility of "looping through" only the bits on the low-order data buses 15, 19, and of switching off the high-order data buses 14, 18, i.e. isolating the two halves from each other to be able to use plug-in boards 26–28 with narrower data buses on the interface 20. The information present on the wire 17 can then consequently correspond to a control signal which switches the high-order bits on and off.

Because a RISC-type processor 1 can be used which is relatively fast and has only two outgoing control wires 2, 3, the use of a multiplexer 4 can prove necessary to activate the interface 20. In the drawings, a read signal wire 2 of the processor 1 is marked RD ("read"), while a write signal wire 3 is marked WR ("write"). If the processor 1 is reading in data, a logic "1" would typically be present on the read signal wire 2, while on the other hand a "1" would typically be present on the write signal wire 3 when the processor 1 is transmitting data to the interface 20.

On the other hand, the interface 20 would typically have four signal wires 6–9, one of which can typically be set to "1" at any one time. If the processor 1 is transmitting date to an external device via the interface, the write signal wire 6 marked I/O WR would typically be set to "1", whereas if the processor 1 is reading in data from an external device via the interface, the read signal wire 7 marked I/O RD would typically be set to "1". Analogously, if the objective is to write data onto a memory board connected to the interface 20, the write signal wire 8 marked MEMWR for external storage media would typically be set to "1". Finally, the read signal wire 9 marked MEMRD for external memory boards would be set to the "1" condition as soon as the processor 1 intends to read out data from an external memory board.

To operate a fast processor 1, such as an RISC processor, having only two wires 2, 3, with the interface, having four wires 6–9, the processor preferably activates an address decoder 21 via the address bus 11. The address decoder 21 recognizes, from the address present on the bus 11, whether, on the one hand, the processor 1 is performing an input or an output operation involving a peripheral device or, on the other hand, is writing data onto or reading out data from a storage location associated with an external storage medium.

The multiplexer 4 controls the four signal wires 6–9, connected to the interface 20, by referring to the signal at the output 22 of the address decoder 21 and also to the signals on the read and write signal wires 2, 3, associated with the processor 1.

Thus, if the read signal wire 2 of the processor 1 is in the "1" condition, and if it can be recognized, by referring to the signal at the output 22 of the address decoder 21, that a storage operation is being performed, the multiplexer 4 would preferably set only the MEMRD read signal wire 9 for external storage media to "1". If the processor 1 intends to read out data from an external device, the output of the address decoder 21 changes over to the complementary logic condition, and only the I/O RD signal wire 7 would be set to "1". Correspondingly—depending on the signal at the output 22 of the address decoder 21, the I/O WR signal wire 6 or, as the case may be, the MEMWR signal wire 8, is set to "1" if the write signal wire 3 associated with the processor 1 is in the "1" condition. It should also be pointed out that, instead of the respective read, or, as the case may be, write signals present on the wires 2, 3, 6–9, it is also possible for the logical complements of these signals to be present on these wires.

In addition, the interface 20 can preferably have a separate clock generator in the form of a baud rate generator 23.

In view of the above, the result is a printer which features universal, all-purpose usability, and a high operating speed which results from the use of a fast processor in conjunction with a universal interface.

One feature of the invention resides broadly in a printer with a universal interface, with a processor 1 which can be connected to a storage medium 26, 27 as well as to data input and data output connections 28 for external devices, characterized by a common interface 20 which is activated by the processor 1, and to which it is possible to connect both the storage medium 26, 27 and the data input and data output connections 28 for external devices.

Another feature of the invention resides broadly in the printer, characterized by the fact that the interface 20 has a write signal wire 6 and a read signal wire 7 for data input and data output connections 28 for external devices, as well as a write signal wire 8 and a read signal wire 9 for storage media 26, 27.

Still another feature of the invention resides broadly in the printer, characterized by a multiplexer 4 which controls the write signal and read signal wires 6–9 of the interface 20 by referring to the signal on a read signal wire 2, the signal on a write signal wire 3 and the address bus 11 associated with the processor 1.

Yet another feature of the invention resides broadly in the printer, characterized by an address decoder 21 which controls the multiplexer 4 by referring to the address bus 11 associated with the processor 1.

Still yet another feature of the invention resides broadly in the printer, characterized by the fact that the processor 1 can switch over from one width of the data bus 18, 19 to another, the data bus being the one associated with the interface 20.

Yet still another feature of the invention resides broadly in the printer, characterized by a baud rate generator 23 which serves as a clock generator associated with the interface 20, the processor 1 having a clock generator 5 of its own.

Another feature of the invention resides broadly in the printer, characterized by the fact that the processor 1 controls a printing mechanism 25.

Still another feature of the invention resides broadly in the printer, characterized by the fact that the printer is a thermal printer which is capable of printing on strips of labels.

Yet still another feature of the invention resides broadly in the printer, characterized by a graphics board 32 which can be connected to the interface 20.

Still yet another feature of the invention resides broadly in the printer, characterized by the fact that the processor 1 is a RISC processor.

Some types of printers and the various components thereof which could be used in conjunction with the present invention are disclosed by the following U.S. Patents: U.S. Pat. No. 5,160,943 to Pettigrew et al., entitled "Printing Systems"; U.S. Pat. No. 5,055,858 to Koch, entitled "Thermal Print Head"; U.S. Pat. No. 5,023,628 to Koch, entitled "Thermal Head Mounting/Positioning Assembly"; U.S. Pat. No. 5,165,806 to Collins, entitled "Thermal Printer with Movable Drive Roll"; U.S. Pat. No. 4,326,813 to Lomicka and Heller, entitled "Dot Matrix Character Printer Control Circuitry for Variable Pitch Printing"; and U.S. Pat. No. 4,214,836 to Wang, entitled "Impact Print Head".

Some examples of RISC processors which could possibly be used in conjunction with the printer in accordance with the present invention are disclosed by the following U.S. Patents: U.S. Pat. No. 5,201,056 to Daniel and Short; entitled "RISC Microprocessor Architecture With Multi-Bit Tag Extended Instructions for Selectively Attaching Tag from Either Instruction or Input Data to Arithmetic Operation Output"; U.S. Pat. No. 5,214,786 to Watanabe et al., entitled "RISC System Performing Calls and Returns Without Saying or Restoring Window Pointers and Delaying Saving Until Multi-Register Areas are Filled"; U.S. Pat. No. 5,269,007 to Hanawa and Nishimukai, entitled "RISC System Capable of Simultaneously Executing Data Interlocked Shift and Arithmetic/Logic Instructions in One Clock Cycle By Bypassing Register"; and U.S. Pat. No. 5,287,522 to Brown et al., entitled "External Procedure Invocation Apparatus Utilizing Internal Branch Vector Interrupts and Vector Address Generation, in a RISC Chip".

Some examples of multiplexers which could possibly be used in conjunction with the printer in accordance with the present invention are disclosed by the following U.S. Patents: U.S. Pat. No. 5,313,323 to Patel, entitled "Fiber Optic Bus and Tag Adapter for Block Multiplexer Channel", U.S. Pat. No. 5,191,656 to Fords and Rosenberg, entitled "Method and Apparatus for Shared Use of a Multiplexed Address/Data Signal Bus by Multiple Sue Masters"; 5,206,859 to Anzai, entitled "ISDN Multimedia Communications System"; and U.S. Pat. No. 5,206,946 to Brunk, entitled "Apparatus Using Converters, Multiplexer and Two Latches to Convert SCSI Data into Serial Data and Vice Versa".

Some examples of universal interfaces which could possibly be used in conjunction with the printer in accordance with the present invention are disclosed by the following U.S. Patents: U.S. Pat. No. 5,249,218 to Sainton, entitled "Programmable Universal Interface System"; U.S. Pat. No. 5,264,958 to Johnson, entitled "Universal Communications Interface Adaptable For a Plurality of Interface Standards"; U.S. Pat. No. 5,326,093 to Sollitt, entitled "Universal Interface Module Interconnecting Various Copiers and Printers with Various Sheet Output Processors"; and U.S. Pat. No. 5,333,177 to Braitberg et al., entitled "Universal Connection For Cellular Telephone Interface".

Some examples of timing clock generators which could possibly be used in conjunction with the printer in accordance with the present invention are disclosed by the following U.S. Patents: U.S. Pat. No. Re. 34206 to Sayer, entitled "Method and Apparatus for Timing Recovery"; U.S. Pat. No. 5,237,590 to Kazawa et al., entitled "Timing Extraction Circuit and Communication System Utilizing the Same"; U.S. Pat. No. 5,276,711 to Rossi et al., entitled "Receiver for a Data Signal Which Includes Data Symbols Occurring at a Given Baud Rate"; and U.S. Pat. No. 5,299,237 to Head, entitled "Asymmetrical Data Tracking Digital Phase Locked Loop".

Some further examples of RISC processors along with data buses, address buses, and buffers, which could possibly be used in conjunction with the printer in accordance with the present invention are disclosed by the following U.S. Patents: U.S. Pat. No. 5,333,259 to Jung, entitled "Graphic Information Processing System Having a RISC CPU for Displaying Information In A Window"; U.S. Pat. No. 5,187,796 to Wang and Srinivasen, entitled "Three-Dimensional Vector Co-Processor Having I, J, and K register files and I, J, and K Execution Units"; U.S. Pat. No. 5,216,748 to Quenot et al., entitled "Integrated Dynamic Programming Circuit"; U.S. Pat. No. 5,245,583 to Li et al., entitled "Integrated Circuit Memory With Decoded Address Sustain Circuitry For Multiplexed Address Architecture And Method"; and U.S. Pat. No. 5,276,833 to Auvinen and Nale, entitled "Data Cache Management System With Test Mode Using Index Registers and CAS Disable and Posted Write Disable".

Some examples of address decoders which could possibly be used in conjunction with the printer in accordance with the present invention are disclosed by the following U.S. Patents: U.S. Pat. No. 5,305,277 to Derwin et al., entitled "Data Processing Apparatus Having Address Decoder Supporting Wide Range of Operational Frequencies"; U.S. Pat. No. 5,274,788 to Koike, entitled "High Speed Memory Access for A Data Processor"; U.S. Pat. No. 5,287,503 to Narad, entitled "System Having Control Apparatus Coupled to a Bus Whereby Addresses on the Bus Select a Control Register and a Function to be Performed on the Control Apparatus"; and U.S. Pat. No. 5,327,545 to Begun et al., entitled "Data Processing Apparatus for Selectively Posting Write Cycles Using the 82385 Cache Controller".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 32 609.9, filed on Sep. 24, 1993, having inventor Gamal Hagar, and DE-OS P 43 32 609.9 and DE-PS P 43 32 609.9, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A printer for printing on a printable medium and for transferring data between said printer and an external data processing device and additionally between said printer and a digital storage device, said printer comprising:

a printer element;

printable medium supply means for supplying said printable medium;

processor means for controlling at least some of the operations of said printer;

universal interface means for providing data transfer between said printer and said external data processing device and additionally between said printer and said digital storage device;

said universal interface means comprising a common interface element, said common interface element comprising:

external data processing device connection means for transferring data between said processor means and said external data processing device; and digital storage device connection means for transferring data between said processor means and said digital storage device; and said universal interface means additionally comprising:

first write signal means for generating a first write signal enabling writing of data from said processor means, through said common interface element and to said external data processing device;

first read signal means for generating a first read signal enabling reading of data from said external data processing device, through said common interface element and to said processor means;

second write signal means for generating a second write signal enabling writing of data from said processor means, through said common interface element and to said digital storage device; and second read signal means for generating a second read signal enabling reading of data from said digital storage device, through said common interface element and to said processor means.

2. A printer according to claim 1:

wherein said processor means additionally comprises:

address bus means for generating address signals designating an external device to be addressed by said processor means;

said external device to be addressed by said processor means comprising at least one of said external data processing device and said digital storage device;

processor read signal means for generating a processor read signal to enable the reading of data from said external device, through said common interface element and to said processor means; and processor write signal means for generating a processor write signal to enable the writing of data from said processor means, through said common interface element and to said external device; and wherein said universal interface means additionally comprises:

multiplexer means for receiving said address signals, said processor read signal and said processor write signal and for selectively generating therefrom at least one of:

said first write signal enabling writing of data from said processor means, through said common interface element and to said external data processing device;

said first read signal enabling reading of data from said external data processing device, through said common interface element and to said processor means;

said second write signal enabling writing of data from said processor means, through said common interface element and to said digital storage device; and said second read signal enabling reading of data from said digital storage device, through said common interface element and to said processor means.

3. A printer according to claim 2:

wherein said universal interface means additionally comprises address decoder means for receiving said address signals generated by said processor means, for decoding said address signals generated by said processor means to generate decoded signals therefrom and for supplying said decoded address signals to said multiplexer means.

4. A printer according to claim 3:

wherein said processor means additionally comprises a processor data bus having a data width substantially equal to a determined word length;

wherein said common interface element comprises:

one external device data bus for connecting to one of said external devices, said one external device data bus having a data width substantially equal to said determined word length; and another external device data bus for connecting to another of said external devices, said another external device data bus having a data width substantially less than said determined word length; and wherein said universal interface means additionally comprises switchable connection means for selectively connecting at least one of said one external device data bus and said another external device data bus to said processor data bus.

5. A printer according to claim 4:

wherein said processor means additionally comprises processor clock means for generating timing signals for timing operations of said processor means; and wherein said universal interface means additionally comprises universal interface clock means for generating additional timing signals for timing operations of said universal interface means;

said universal interface clock means being separate and distinct from said processor clock means.

6. A printer according to claim 5:

wherein said processor means additionally comprises printer control means for receiving printable data and for controlling the operation of said printer in printing said printable data on said printable medium.

7. A printer according to claim 6:

wherein said printer element comprises a thermal printer element; and wherein said printable medium comprises label material in a strip form.

8. A printer according to claim 7:

wherein said digital storage device comprises a graphics card.

9. A thermal label printer for printing labels on a label material, said thermal label printer comprising:

print means;

at least one printing element disposed on said print means, said at least one printing element being configured to be thermally heated to print a label;

counterpressure means disposed adjacent said at least one printing element for being pressed upon by said at least one printing element;

means for storing label material to be printed on;

means for storing thermal printing ribbon, the thermal printing ribbon comprising a printing substance for being transferred to the label material;

means for providing label material to be printed on from said means for storing label material to an area between said at least one printing element and said counterpressure means;

means for providing thermal printing ribbon from said means for storing thermal printing ribbon to an area between said at least one printing element and the label material;

means for actuating said at least one printing element for heating said at least one printing element and for transferring printing substance from said thermal printing ribbon to the label material to print a label;

computer processor means for controlling said means for providing label material, for controlling said means for providing thermal printing ribbon, and for controlling said means for actuating said at least one printing element;

means for inputting information to be printed on labels to said computer processor means, said computer processor means further comprising: means for receiving said input information, means for processing said input information; and means for outputting control signals to at least one of:

said means for providing label material, said means for providing thermal printing ribbon, and said means for actuating said at least one printing element, to print the input information on the label material to produce a label; and said thermal label printer further comprising a universal interface, said universal interface comprising means for connecting said processor to at least two external devices, said at least two external devices comprising at least two of: external memory, a graphics board, at least one data input connection and at least one data output connection.

10. The printer according to claim 9, wherein:

said counterpressure means comprises a counterpressure roller;

said means for inputting information comprises at least one of: a keyboard and a control panel; and said universal interface comprises:

a first signal wire for carrying a signal indicating writing to at least one data output connection;

a second signal wire for carrying a signal indicating reading from at least one data input connection;

a third signal wire for carrying a signal indicating writing to external memory; and a fourth signal wire for carrying a signal indicating reading from external memory.

11. The printer according to claim 10, wherein:

said computer processor means comprises:

a fifth signal wire for carrying a signal indicating writing output; and a sixth signal wire for carrying a signal indicating reading input;

said printer further comprises a multiplexer for controlling access of said first and third signal wires by said fifth signal wire and for controlling access of said second and fourth signal wires by said sixth signal wire;

said printer further comprises an address bus for carrying an address location for accessing said at least one external device; and said multiplexer is configured for controlling access of said first and third signal wires and of said second and fourth signal wires as a function of an address location carried by said address bus and the signal being carried by one of said fifth and sixth signal wires.

12. The printer according to claim 11, wherein:

an address location carried by said address bus is indicative of an operation being performed by said computer processor means, said operation being one of:
  a reading/writing by the computer processor means to an external memory; and
  an input/output by the computer processor means to a device connected to one of: said at least one data input connection and said at least one data output connection;

said computer processor means further comprises an address decoder for:
  reading an address from said address bus,
  determining the type of operation said computer processor means is performing, and providing a signal to said multiplexer indicative of the type of operation said computer processor means is performing; and said multiplexer being configured for receiving said signal from said address decoder and providing a connection between one of:
  said first and fifth signal wires;
  said third and fifth signal wires;
  said second and sixth signal wires; and
  said fourth and sixth signal wires.

13. The printer according to claim 12, further comprising at least one data bus for transferring information between said computer processor means and said universal interface, said at least one data bus comprising an 8-bit data bus for carrying an 8-bit data word.

14. The printer according to claim 13, wherein:

said at least one data bus comprises two parallel data buses, both of said two parallel data buses comprising 8-bit data buses for together carrying a 16-bit data word;

said printer further comprises a data buffer, said two parallel data buses carrying data through said data buffer;

said data buffer comprising means for interrupting transmission of data along one of said two parallel data buses and for resuming transmission of data along the interrupted one of said two parallel data buses for selectively switching between carrying 8-bit and 16-bit data words between said computer processor means and said universal interface;

said computer processor means comprises means for controlling said selective switching of said data buffer;

said computer processor means comprises a first clock generator for defining a first operating frequency of said computer processor means;

said universal interface comprises a second clock generator for defining a second operating frequency of said universal interface;

said second clock generator being configured to operate said computer processor at an operating frequency greater than said first operating frequency;

said second clock generator comprises a baud rate generator;

said computer processor means comprises a Reduced Instruction Set Computer Processor;

said universal interface comprises connection means for being connected to plug-in circuitry boards of said at least one of: the external memory, a graphics board, and the at least one data input connection and the at least one data output connection;

said universal interface comprises connection means for being connected to a combination of at least three of: the external memory, the graphics board, and the at least one data input connection and the at least one data output connection;

said address bus comprises a first address bus portion and a second address bus portion;

said computer processor means further comprises an additional buffer;

said additional buffer has at least a first buffer portion, said first buffer portion being disposed between and interconnecting said first address bus portion and said second address bus portion, and said first buffer portion comprising a unidirectional transport for transporting address data only from said computer processor means to said universal interface;

said additional buffer further comprises a second buffer portion disposed between and interconnecting said computer processor means and said two parallel data buses, said second buffer portion comprising a bidirectional transport for transporting data from said computer processor means to said universal interface and from said universal interface to said computer processor means;

said first, second, third, fourth, fifth and sixth signal wires transmit a logic "1" for indicating the operation of said computer processor means;

the data input and data output connections comprise connections for at least one of: a centronics interface, an RS 232 interface, an RS 485 interface, an Ethernet network interface, a coaxial interface and a twinax interface;

the graphics boards comprise graphics boards for display screens for visually depicting images to be printed;

said print means comprises a print head;

said at least one printing element comprises a plurality of aligned printing elements;

said plurality of printing elements being aligned along said counterpressure roller;

said means for storing thermal printing ribbon comprises a cassette, said cassette comprising a payoff spool for supplying thermal printing ribbon and a takeup spool for taking up thermal printing ribbon after passage of the thermal printing ribbon through the area between said at least one print head and said counterpressure means; and said means for actuating said at least one printing element comprises means for electronically heating selected ones of said plurality of printing elements to selectively print on the label material to produce a printed image on the label material.

15. A thermal printer for printing on a printable medium and for transferring data between said printer and an external data processing device and additionally between said printer and a digital storage device, said printer comprising:

a printer element disposed on said print means, said at least one printing element being configured to be thermally heated to print a label;

printable medium supply means for supplying said printable medium;

counterpressure means disposed adjacent said at least one printing element for being pressed upon by said at least one printing element;

means for storing label material to be printed on;

means for storing thermal printing ribbon, the thermal printing ribbon comprising a printing substance for being transferred to the label material;

means for providing label material to be printed on from said means for storing label material to an area between said at least one printing element and said counterpressure means;

means for providing thermal printing ribbon from said means for storing thermal printing ribbon to an area between said at least one printing element and the label material;

means for actuating said at least one printing element for heating said at least one printing element and for transferring printing substance from said thermal printing ribbon to the label material to print a label;

computer processor means for controlling said means for providing label material, for controlling said means for providing thermal printing ribbon, and for controlling said means for actuating said at least one printing element;

means for inputting information to be printed on labels to said computer processor means, said computer processor means further comprising: means for receiving said input information, means for processing said input information; and means for outputting control signals to at least one of:

said means for providing label material, said means for providing thermal printing ribbon, and said means for actuating said at least one printing element, to print the input information on the label material to produce a label;

processor means for controlling at least some of the operations of said printer; and universal interface means for providing data transfer between said printer and said external data processing device and additionally between said printer and said digital storage device;

said universal interface means comprising a common interface element and means for connecting to at least two external devices, such as external memory, a graphics board, at least one data input connection and at least one data output connection, said common interface element comprising:

external data processing device connection means for transferring data between said processor means and said external data processing device; and digital storage device connection means for transferring data between said processor means and said digital storage device.

\* \* \* \* \*

UNITED STATES PATENT AND TRADEMARK OFFICE
CERTIFICATE OF CORRECTION

PATENT NO. : 5,684,931  
DATED : November 4, 1997  
INVENTOR(S) : Gamal HAGAR

Page 1 of 2

It is certified that error appears in the above-identified patent and that said Letters Patent is hereby corrected as shown below:

On the title page, item [56], under the U. S. PATENT DOCUMENTS section, add the following reference:

--5,425,135   6/1995   Motoyama et al.--.

On the title page, item [56], under the FOREIGN PATENT DOCUMENTS section, add the following references:

--2,979,292   7/1993   Australia  
  0,645,733   3/1995   Europe--.

In column 1, line 39, after 'Background', delete "of the Invention" and insert --Information--.

In column 4, line 45, after the first occurrence of 'the', delete "date" and insert --data--.

In column 5, line 31, after 'label', delete "stripe" and insert --strips--.

In column 7, line 30, after 'label', delete "strap" and insert --strip--.

UNITED STATES PATENT AND TRADEMARK OFFICE
CERTIFICATE OF CORRECTION

PATENT NO. : 5,684,931
DATED : November 4, 1997
INVENTOR(S) : Gamal HAGAR

It is certified that error appears in the above-identified patent and that said Letters Patent is hereby corrected as shown below:

In column 10, line 4, before 'bidirectional', delete "e" and insert --a--.

In column 10, line 47, after 'transmitting', delete "date" and insert --data--.

In column 12, line 28, after 'out', delete "Saying" and insert --Saving--.

In column 12, line 42, after 'to', delete "Fords" and insert --Forde--.

In column 12, line 44, after 'Multiple', delete "Sue" and insert --Bus--.

Signed and Sealed this

Twenty-eighth Day of July, 1998

Attest:

Attesting Officer

BRUCE LEHMAN
Commissioner of Patents and Trademarks